US006978291B2

(12) United States Patent
Vardi et al.

(10) Patent No.: US 6,978,291 B2
(45) Date of Patent: Dec. 20, 2005

(54) METHOD FOR CORRELATING JOB-STEP OR EXECUTION-PROCESS INFORMATION WITH CORRESPONDING SOFTWARE LICENSING INFORMATION

(75) Inventors: David Vardi, New York, NY (US); Per Hellberg, New York, NY (US); Robert Barritz, New York, NY (US)

(73) Assignee: Isogon Corporation, New York, NY (US)

( * ) Notice: Subject to any disclaimer, the term of this patent is extended or adjusted under 35 U.S.C. 154(b) by 690 days.

(21) Appl. No.: 09/845,235

(22) Filed: Apr. 30, 2001

(65) Prior Publication Data

US 2002/0161930 A1 Oct. 31, 2002

(51) Int. Cl.[7] .................................... G06F 9/54
(52) U.S. Cl. ......................... 709/202; 719/317; 705/59
(58) Field of Search ............................ 717/168–178; 705/59; 719/310, 317; 709/200–203, 223–224

(56) References Cited

U.S. PATENT DOCUMENTS

| | | | | |
|---|---|---|---|---|
| 5,138,712 A * | 8/1992 | Corbin | ....... | 713/200 |
| 5,204,897 A * | 4/1993 | Wyman | ....... | 710/200 |
| 5,260,999 A * | 11/1993 | Wyman | ....... | 705/59 |
| 5,438,508 A * | 8/1995 | Wyman | ....... | 705/8 |
| 5,499,340 A * | 3/1996 | Barritz | ....... | 714/47 |

* cited by examiner

*Primary Examiner*—St. John Courtenay, III
(74) *Attorney, Agent, or Firm*—Ostrolenk, Faber, Gerb & Soffen, LLP

(57) ABSTRACT

A software processing method enhances the functionality of job-step, charge-back systems by providing accurate charge-backs based on cognizance of software products actually being used. In the invention, a license manager operating directly or via a plurality of agents interfaces with software clients and/or process-data collectors to correlate the process-related information with the software product use information.

14 Claims, 4 Drawing Sheets

METHOD FOR CORRELATING JOB-STEP OR EXECUTION-PROCESS INFORMATION WITH CORRESPONDING SOFTWARE LICENSING INFORMATION

BACKGROUND OF THE INVENTION

The present invention relates generally to computer software and more specifically to a processing method which improves the functionality of job-step charge-back systems, by enabling and providing a more accurate charge-back based on cognizance of software products being used.

Much of the software in use by corporations, organizations and individuals is licensed either directly or indirectly from a variety of software vendors. The rights granted the licensees may take a variety of forms. For example, a software product might be licensed to an organization for unlimited use, on any number of computers, but only within that organization. Or, the organization might be permitted to only use the software on certain computers, or may only be permitted to allow its use by certain named employees, or by only a specified maximum number of concurrent employees, or until a specified date, or only on certain days of the week, or based on any other set of restrictions that the vendor may negotiate with the organization.

In many cases, vendors have incorporated protective mechanisms (PMs) into their software products to try and determine whether the usage restrictions that are embodied in the license terms are ever violated in practice. For example, such a PM, which is typically invoked when the associated software product is initiated, might determine whether the computer (as identified by such things as a serial number or other unique characteristic) that the software is operating on is on the list of computers that the software is licensed to. Or, the PM might count the number of users concurrently using the software, checking to see whether a licensed maximum is ever exceeded.

If the PM detects attempted violations, a variety of actions may be taken, from issuing a warning while allowing execution, to preventing the software from operating. Typically, the PM also keeps a log of all such violation attempts.

For the PM to be able to match the actual use of a software product to the organization's licensed rights, the PM must know what those rights are. These are often embodied in a license certificate or via an encrypted password which the software vendor gives to the organization, which in turn supplies it to the PM. Typically, a PM will not allow the software product to operate at all if a certificate is not supplied, missing, expired, or otherwise not made "known" to the PM.

While many vendors have developed their own PM, some use general purpose software supplied to them by other vendors. Such general PM facilities are known as License Managers (LMs), and are available from a variety of vendors, including Isogon (LicensePower/iFOR), Globetrotter (FLEXlm), IBM (LUM), and Rainbow (SentinelLM). As with PMs written by the product vendors themselves, LMs from different vendors use certificates in different forms and administer them in different ways.

In March of 1999, an IT industry standard for LMs was approved by The Open Group. Known as XSLM, the standard is expected to encourage the development of XSLM-compliant LMs from several LM vendors. In particular, Isogon Corporation and IBM are jointly developing an XSLM-compliant LM that may be marketed by each of the parties under their respective brands.

A major function of an XSLM-compliant licensing system is to collect and record data about the usage of the licensed products and relevant events related to license management for a heterogeneous system of computer systems. An XSLM-compliant system is generally composed of a server that operates on one or more of the computers within the network of computers and "agent" software that operates on each or selected ones of the individual computers (and individual LPARs) within the network, communicating with the server and enforcing the licensing policies. Agent software is developed for the operating system and computer system upon which it executes, and in some instances, the agent software is incorporated directly into the server. Accordingly, a single XSLM-compliant system can collect and record data about multiple operating systems, computer hardware configurations, and a diverse set of licensed software products.

A compliant XSLM system (hereinafter referred to as XSLM) maintains, in a database and/or log files, three types of information: certificate data, status data, and historical data.

Certificate data is the combination of information embodied in the license certificate initially provided by the software vendor; information provided by the customer's license administrator to complement or override, when allowed, the licensing policy specified in the license certificate; and, in some instances, information created and maintained by the XSLM.

Status data is collected by the licensing system while it is running. At prescribed points in time, it provides information about the licenses presently in use and the value of various meters maintained by the licensing system. Some applications can be licensed based on the count of some units whose meaning in general is known only to the application, and the licensing system keeps track of the units to be counted, acting as a "record keeper." The updating of the meter is explicitly requested by the application with an API call or is automatically performed by another process. A change in the status information is also triggered by events external to the licensing system, such as the request for a new license, a change in policy setting (e.g. the administrator switching from soft stop to hard stop) the expiration of a timer, or a change in the computing environment (e.g., the MIPS capacity of a partition is changed, a processor added, parameters or data affecting computing operations, etc.).

Historical data is the persistent log of events relevant to license management. All or selected events related to license administration actions are logged to form an audit trail (e.g. the addition or deletion of a certificate to/from the license database). The logging of events related to license usage (e.g. an application requesting or releasing a license, or a meter being updated) is usually either under the administrator's control or specified by rules in the license certificate.

Computer software products execute under the control of a particular instance of an operating system. The operating system may control an entire single physical computer; a complex or Sysplex of closely-coupled computers; a network of computers; or only a subdivision or partition of a single physical computer; with other operating system instances controlling other partitions.

For example, the operation of a desktop PC may be entirely controlled by Windows 98, or the PC may be partitioned so as to selectively (though not concurrently) be controlled by Windows 2000, Linux, or some other operating system. On other computers, such as the S/390 mainframe, multiple logical partitions (LPAR) can be established in which separate operating systems may operate concurrently. Each operating system instance, whether controlling an entire computer, a partition of a computer, a complex of computers, or network of computers, is referred to as a Logical Operating System (LOS).

The XSLM is responsible for controlling the licensed software products that execute under the LOS, ensuring that the software is used by valid, authorized customers, in accordance with licensed rights. Software products, instrumented to do so, accomplish this by engaging in a licensing session consisting of a prescribed dialog of function calls with the XSLM.

The license session typically begins when the product performs a "Get-License" function call [xslm_basic_request_license( ) or xslm_adv_request_license( )] to the XSLM in order to determine whether the product has permission to execute further. If a certificate exists, and meets the circumstances of the product's proposed execution (e.g., a valid user-id, and/or computer serial number, or LOS id, or other license terms and conditions) the product receives an "okay-to-process" return code from the Get-License request. In the simplest case, the license session ends when the product issues the "Release-License" function call [xslm_basic_release_license( ) or xslm_adv_release_license( )] to indicate that the product's operation is complete. There may also be intervening function-calls within the license session to update status and historical data or to perform other XSLM functions.

In order to associate all function calls of a license session with one another, and to recognize that all are part of the same session, the XSLM assigns a "License-Handle" (a unique code-value) to the session, and returns it to the software product as part of the information returned by Get-License. The software product must then supply the same License-Handle as part of each subsequent function call within the session. As a convenience to the requesting program, the XSLM permits it to specify a "token" (in many API function calls) that is further associated with the licensing session. If the value of the token was not set to zero, the licensing system signs all the data transmitted in the API call (i.e., all the input parameters as received by the application and all the output parameters just computed) using the private key of the licensing system publisher.

Typically, subject to the preferences of the customer, the XSLM will record or log certain information about each function call. For example, recorded information applicable to Get-License requests might include the time the request was made; the value of the License-Handle applicable to the dialog of which the Get-License is part; the software product making the request; the LOS-id; the user-id of the user executing the product; and whether the request was granted or denied. This information is potentially of great use and interest to those who wish to know what software products are in use within their organization, how often they're used, whether any attempts at use were beyond licensed limits and thus denied, and so forth.

On most computer systems, a variety of information about the particular program-processes (for example, the job or job-step on the OS/390 mainframe) that execute on each LOS is also captured and recorded or logged (independently of whether the program uses XSLM or not), either by the LOS itself or by other software facilities operating on the system. Process-related information may include the job-name; the job-id; the LOS-id; "accounting" information applicable to the job; the job-step-id; the processing-program name; the amount of CPU-time consumed by the process; the libraries, files or databases used by the process; the number of input or output operations performed; etc. For example, in the OS/390 mainframe environment, much of this process-related information is gathered by the LOS or by its components and recorded in the System Management Facility (SMF) data file.

As an example of process-related information gathered by other software facilities, SoftAudit, a product of Isogon Corporation, captures information about each module used by a job or job-step and records this and additional information to its own log-file. Certain SoftAudit features are described in U.S. Pat. No. 5,590,056, the contents of which are incorporated by reference herein. Similarly, optimization and tuning products, such as InTune from BMC or Strobe from Compuware, capture information related to the efficiency of the process and record this information in their own log files. But, as an alternative, some products of this sort record their information in the OS/390 SMF data-file, using system facilities that permit data to be written to this data-file as special records, or to other system logs. This is done as a convenience, so that the end-user need not deal with a multitude of data files containing diverse data.

Though the XSLM may potentially gather a great deal of data related to the use of licensed software, it is not concerned with determining the particular program-process that might be using the software in a particular instance, or other process-related information, since this information is generally not relevant to issues of enforcing the licensing and licensed rights of the licensor of the licensed software.

In fact, the XSLM standard does not contain, as either a requirement or an option, specifications for determining or recording process identity or process-related information.

Furthermore, there is not a one-to-one correspondence of licensing sessions to executing processes. For example, on OS/390 a particular job or job-step might utilize a single licensed product, multiple licensed products, or no licensed products (in which latter case no licensing sessions would result). In the case of multiple licensed products used within a single process, the associated sessions might occur serially (if the licensed products were used seriatum) or might be interlinked, or nested, if use of a second product was begun before use of the first product was completed. Moreover, multiple successive uses of even a single product would also result in multiple sessions.

Note also that the type of licensing information such as the XSLM gathers and records in a log may also be gathered by other software programs, for example by utilizing an Application Programming Interface (API) that may be provided by the XSLM, or exits which may be provided by the XSLM, or by intercepting the invocations of the XSLM function-calls themselves. This licensing information, as with the licensing information gathered by the XSLM itself, is not correlated to the process it pertains to.

But while process-related information is not needed to enforce licensed rights and license management, and an XSLM-compliant LM provides no means of correlating licensing information relating to, and logged by, the XSLM (or by other programs) with process-data, if these two types of data were correlated, it would be quite valuable to many software asset managers, contracts officers, and system programmers.

Software inventory and usage-monitoring products, such as SoftAudit, correlate the module-name and process-identity or job-number information that they gather, as described above, to the associated product that is being executed. But this information is not further correlated with XSLM licensing information.

SUMMARY OF THE INVENTION

Generally, it is an object of the present invention to provide the system and method that improves the process of job-step charge-back accounting in a computer facility.

It is another object of the invention to provide a system and method which provides greater functionality in charge-back computer software systems.

The present invention realizes the aforementioned and other objects thereof with a system and process that correlate information obtained in connection with job-step execution processes with other information gathered by a product that monitors and obtains data concerning the execution of software products within the computer environment.

Other features and advantages of the present invention will become apparent from the following description of the invention which refers to the accompanying drawings.

DETAILED DESCRIPTION OF EMBODIMENTS OF THE INVENTION

Figure 1:
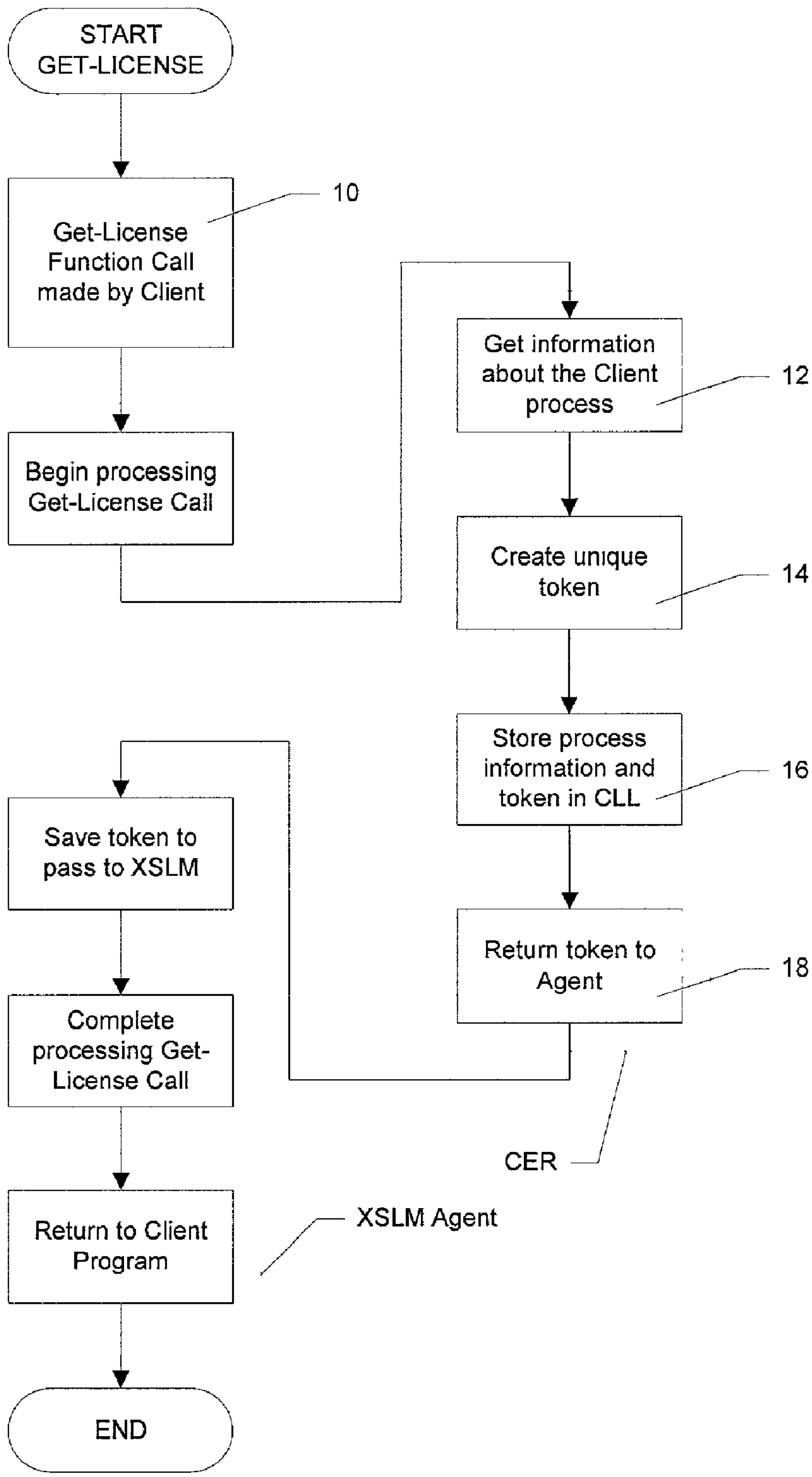
FIG. 1 is a flow chart showing client and agent data transactions.

The term "intercept" means the ability to alter the flow of control of an existing program or operating system in a transparent manner in order to perform a prescribed operation and then return control back to the intercept point and continue processing as though nothing has happened as far as the existing program or operating system is concerned. Typically, techniques for introducing, or "hooking", an additional set of instructions into an existing program or operating system are familiar to those skilled in the art. These may include techniques such as renaming an existing module and substituting a module with the original name, or dynamically changing an address vector to point to the new program, retaining, respectively, the new name or the address of the original program so it can be invoked after the new program competes its operations.

The term "exit" represents a point in a software product at which a user exit routine may be given control to change or extend the functions of the software product at user-specified events. While hooking is provided unbeknownst to the hooked application, user exit routines are expected to be used and their interactions with the application are expected to follow certain rules defined by the application.

As used herein, the term "exit routine" represents program code that may be given control through the use of an "intercept," through an exit, through use of an API, or as program code specifically included in the implementation of the XSLM that gains control during normal license processing.

It is an object of the present invention to provide a method for correlating XSLM licensing data pertaining to licensed software products with process related information such as the process-id, job-id, job step, etc. of the processes using the licensed software products.

Software products, operating on a LOS, as part of the current job-step or process, are considered the clients, while the XSLM, which may be operating on the same or a different LOS, is considered the server. Depending upon the architecture of the particular computer system and operating system, a LOS may have multiple jobs or processes executing concurrently, each within a separate address space (or partition, or region, etc.). Software products invoke the XSLM by issuing one of the defined function calls, which may be initially processed by an XSLM agent operating in conjunction with the client. The agent can perform its processing from within the client address space, or the agent can reside in its own address space. The agent passes the request to the XSLM server and returns the results to the client.

For each request made by a client, the XSLM server processes the request, records the relevant licensing data and returns appropriate information and/or return-codes to the client via the agent. For example, in the most simple case, a software product issues only two function-calls: the Get-License function-call (when the software product is about to begin processing and wants to verify that a valid license is in effect before doing so) and the Release-License function call (at the point that the software product is done with its processing). In this case, the licensing data that is recorded includes the identity of the software product, the identity of the LOS on which the product was executing, the time the license was requested, whether the license was granted or denied, and, if it was granted, when the license was relinquished.

In a number of the embodiments of the invention, certain data is recorded or logged from within the client processing environment. The data may be recorded in a variety of ways, including: to a database; to a file or log specific to this purpose; to a general-purpose system log such as the OS/390 SMF log; or to the XSLM log itself, by use of the Log-Data function call xslm__adv__log( ), which permits arbitrary data to be written to the XSLM log and further, be associated with the current licensing dialog. The log may be intrinsically related to the current LOS, as is the case with SMF, or may contain information from a plurality of LOSs (as does the XSLM log), in which case each data-record logged is augmented with an identifier of the LOS it pertains to. Wherever the data is written, the logical collection of data produced within the client and logged using any of the preceding techniques will be referred to as the Client Logical Log (CLL).

In a preferred embodiment of the invention (A), the XSLM and its agents are augmented to associate client side process information with server side licensing information. The facilities for performing this are described below, beginning with embodiment (A):

1. A facility is provided for passing a token (i.e., unstructured data denoting job related information) between an agent and the XSLM server. In general, an agent creates a token and passes it along with other licensing information (data) to the server. The server token facility associates the data with the token in a manner such as by incorporating the token into the information record that is written to a log file, making the token an index into a database where a record of the data is recorded, etc. Similarly, when the data record is retrieved for an agent the token, if requested, is also returned.

Optionally, the XSLM and its agents are augmented to include the token facility as part of their normal license request processing.

2. Client Exit Routine (CER): XSLM agents are augmented by one or more exit-routines, which, if supplied, receive control during processing of XSLM Get-License function-calls issued by the client. The CER receives control in the client's address space (partition, or region), the agent's address space, or a different one.

Referring to FIG. 1, when the client makes a Get-License function call (step 10), the CER is invoked and then proceeds to gather process-related information (step 12) that identifies the job, job-step, or process that made the call. For example, in the OS/390 mainframe system, the identifying information can be the job-number (a system-wide number uniquely assigned by the operating system to each job that processes in the system), and optionally can include: 1) the job-step number (the first step of a job is number 1, the third step is number 3, etc.); and 2) the current date. As OS/390 "unique" job-numbers are assigned sequentially, the counter may be reset after some days, weeks, or months, therefore the date that the job was executed removes any potential ambiguity. Alternatively, as may be required on other systems, the process may be uniquely identified by the date combined with the time of day at which the process was initiated.

The CER then creates (at step 14) a unique token within the set of tokens generated by the CER on the current LOS. This can be done in a variety of ways, for example by maintaining a counter specific to the LOS, assigning its current value, perhaps combined with the date and time, to a new token, then incrementing the counter.

This token is then passed, along with other parameters and data connected with the Get-License function, to the XSLM server where it is further used in the processing of the request.

Either prior to or immediately after the Get-License function is processed by the server, the CER records (step 16) the process-related information and the corresponding token (collectively known as the "CER-data") in the CLL, i.e., a private log, a system log such as SMF, or, to the XSLM log using the Log-Data function. The CER terminates, returning the value of the assigned token (step 18) as an output-parameter to the agent.

Optionally, the CER retains the value of the token for use by other exit routines and XSLM function calls such as Release-License during the current licensing session.

While it is preferred that such exit routines are implemented in the XSLM agents, the same level functionality is achieved when they are placed in the individual clients.

3. Server Exit Routine (SER): The XSLM server is augmented by one or more exit-routines, which, if supplied, receive control during the processing of XSLM Get-License function-calls made by client programs.

Figure 2:
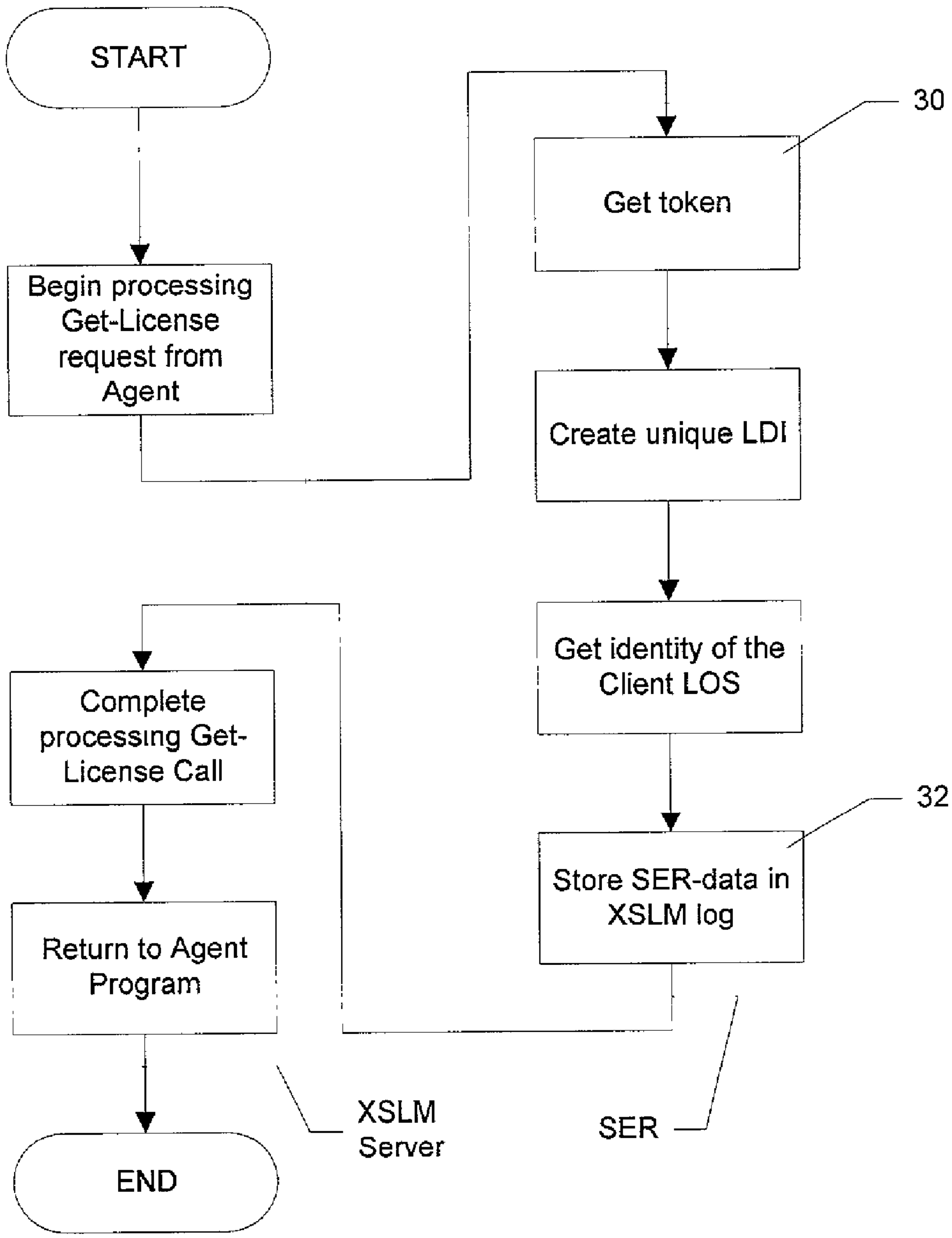
FIGS. 2 and 3 show further process steps of the present invention.

Referring to FIG. 2, each time the SER is invoked, it receives as an input-parameter (step 30) the same token that was created by the CER. The SER proceeds to record (step 32) in the XSLM log, or elsewhere, the following information about the client:

- the token;
- a value intrinsic to the licensing dialog that uniquely identifies the current licensing session that the token applies to (a License Dialog Id, LDI), such as the license-handle; and
- the identity of the LOS that the licensing session applies to.

This information is collectively known as the "SER-data".

Figure 3:
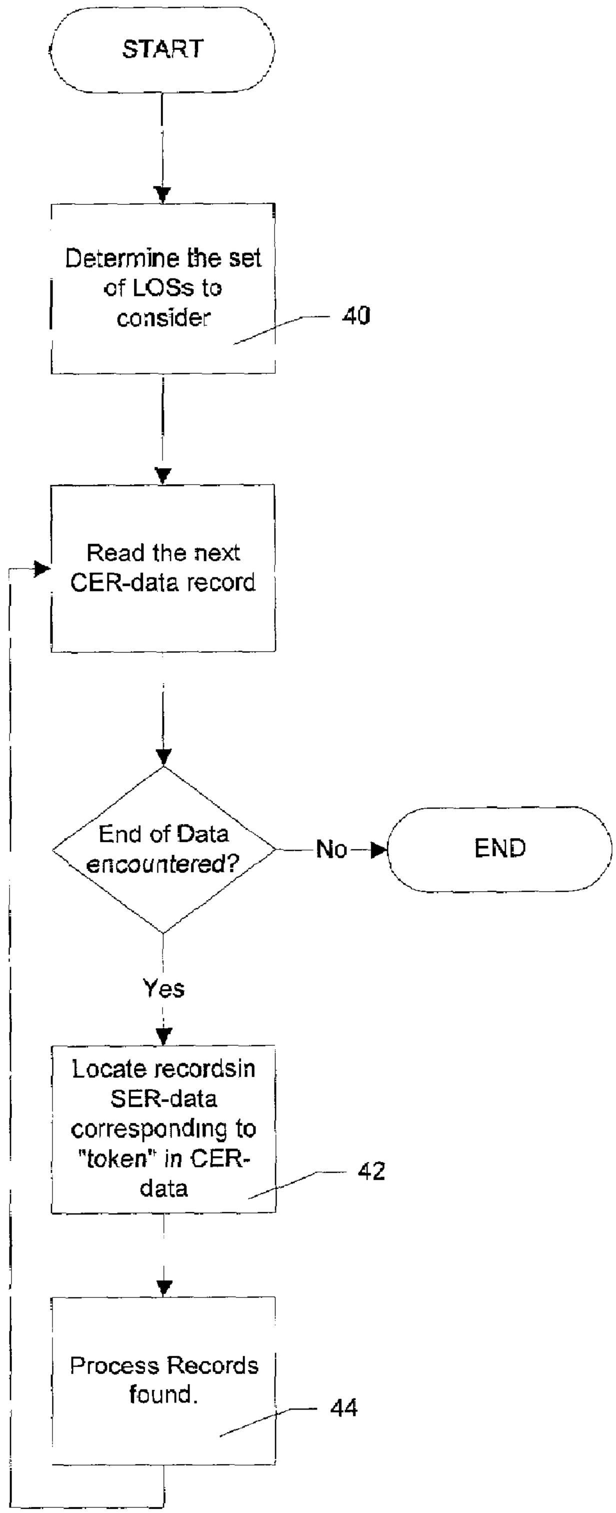

4. Correlator: The Correlator is a process that retrieves and correlates the CER-data from all CLLs and the SER-data that has been gathered. While the user may specify various criteria to be applied, the general operation of the Correlator (FIG. 3) is as follows:

- Determine the set (one or more) of known LOSs to consider (step 40). This may be user-specified, a predetermined set, or simply all LOSs found.
- For each token entry in the CER-data, locate the corresponding entry in the SER-data (step 42). If the LOS for that token does not pertain to the set of LOSs, the data is ignored and processing continues by locating the next token in the CER-data.
- For all matching records found, process the licensing session information (step 44) as follows: Print report, write to a log file, pass to another process, etc.
- Alternatively, the Correlator may create a database, spreadsheet or ordinary file containing all records found which can then be sorted according to the token and other factors as appropriate.

For example, in the OS/390 mainframe environment, this takes the form of correlating licensing dialogs with job-numbers. Once this correlation is obtained, the license session data can then be further correlated with any other data that is keyed by, or tagged with, the job-number.

Figure 4:
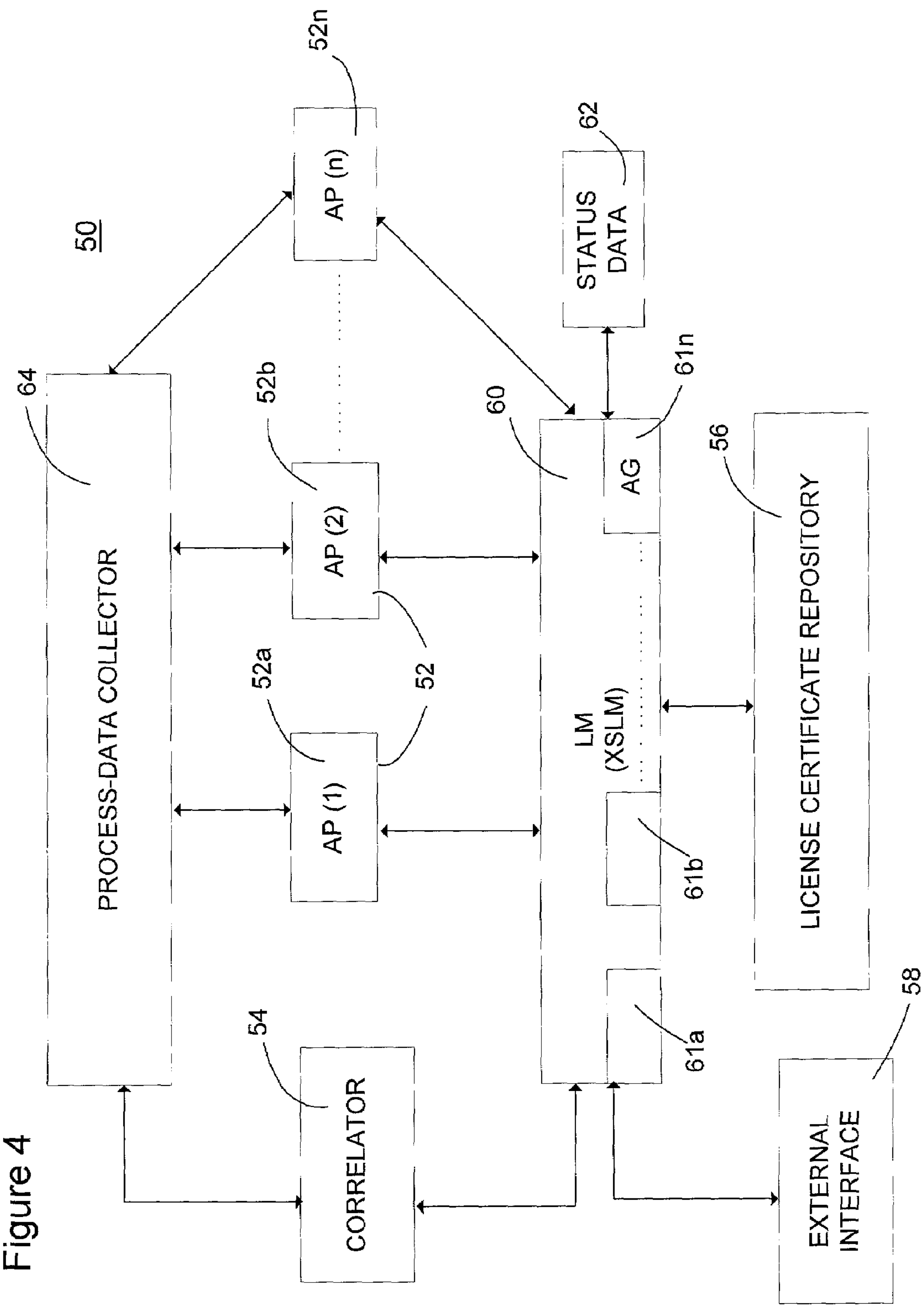
FIG. 4 is a block diagram of major software constituents of the present invention.

Having described the first embodiment (A) of the invention, reference is made to FIG. 4 for a generalized description of major constituents of the invention. This non-limiting illustration shows an overall system 50, which includes both conventional, as well as modified process-data collectors 64 for collecting client related process information, e.g., job-name; job-id; LOS-id; "accounting" information applicable to the job; processing-program name; etc.

As noted, the LM (XSLM 60) operating directly or via its agents 61*a*, 61*b*, . . . 61*n*, has access to a repository 56 of license certificates and communicates with software products 52 comprising application programs 52*a*, 52*b*, . . . 52*n*. Conventionally, the process-data collector 64 and the LM 60 operate independently of one another, collecting information for which no correlation has been attempted in the prior art. The LM 60 may receive status data 62 and communicates via a so-called external interface 58 with facilities that enable it to receive new and/or modify existing license certificates and otherwise manage the licensing environment of the system 50.

In accordance with the present invention, there is provided a software construct known as the correlator 54 which integrates, or at least associates or interfaces the process-data collector 64 and the LM 60 so as to share or exchange information in a manner which achieves the ends of the invention, enabling the license manager to produce licensed software product reports which provide information on the usage of licensed software products, not only in terms of the products per se, but also in conjunction and correlated with the process parameters such as identified above. The correlator 54 is not necessarily a separably identifiable construct, as it may be inextricably intertwined with or be formed as a part of the LM 60 or even the process-data collector 64.

In an alternative embodiment (B), the SER is eliminated with the following changes:

1. The CER, using information returned by the server in response to the Get-License function call, creates its own LDI.
2. The CER gathers and records the process-related information together with the corresponding LDI in the CLL.
3. The CER assigns the LDI to be used as the token in future XSLM function calls for the remainder of the current license session.
4. The Correlator first reads the CLL to determine the LDI of the license session and subsequently uses it to retrieve the corresponding CER-data records with which it performs the matching and correlating process.

In yet another variant (C) of the preferred embodiment:

1. The CER creates a token, that in addition to being unique to the LOS, also contains a representation (optionally compressed or encoded) of the process-id, e.g., in the OS/390 mainframe environment, the job-number.
2. The step in the CER of recording or logging CER-data, i.e., data consisting of the token and process data is omitted.
3. As previously described, the SER records in the XSLM log the token passed, the LDI derived for the current license session, and other data as appropriate.
4. The Correlator retrieves and processes the SER-data that has been gathered to extract the tokens and the corresponding LDIs. The tokens are decompressed or decoded to obtain the process-id, thereby providing the correlation between the process and the licensing session corresponding to the LDI.

In yet another embodiment (D) the present invention functions as follows:

As described earlier, e.g., embodiment (A), XSLM agents are further augmented by one or more client exit-routines, which, if supplied, receive control during processing of one or more types of XSLM function-calls issued by the client. Optionally, when invoked, the CER is provided with the parametric input information originally supplied to the function-call by the software product and the return-code or completion-code. For example, if a CER exit receives control during the processing of a Get-License function call, the completion-code indicates, among other things, whether the requested license was granted.

When the client makes one of the specified XSLM function calls, the corresponding CER routine is invoked and then proceeds to gather and record process-related information including one or more of the following:

process-id or job-id job-step-id

"accounting" data pertaining to the job and as appropriate for the particular licensing function call LOS-id or corresponding identifier the identity or name of the module issuing the function-call date and time etc.

Additionally, the CER optionally gathers some or all of the parametric input data supplied to the function call (which serves to identify the software product requesting the license, the vendor, and the particulars of the type of license-usage being requested); and, the return-code or completion code of the function call.

The CER records all of this process-related information in the CLL.

Subsequently, the Correlator retrieves and processes the CER-data that has been gathered in the CLL. Each data record that has been written to the CLL contains all relevant process and licensing related information, inherently correlating process-id with applicable licensing data, ready for direct use.

In yet another alternative embodiment (E), XSLM agents are augmented by one or more client exit-routines, which, if supplied, receive control during processing of XSLM Get-License function-calls issued by the client. When the client makes a Get-License function call, the CER is invoked and then proceeds to gather and record process-related information that identifies the job, job-step, or process that made the call.

Optionally, as described in embodiment (A), the CER creates a token within the set of tokens generated by the CER on the current LOS. This token is then passed, along with other parameters and data connected with the Get-License function, to the XSLM server where it is further used in the processing of the request. Upon return, the CER records the process-related information in the XSLM log using the Log-Data function where it can later be retrieved and processed by the Reporter.

In another embodiment (F), the present invention, employing a CER, captures both process information and sufficient information about the various XSLM function calls that are issued in the client in conjunction with ongoing sessions, and records them in the CLL in order to later match this sequence with corresponding information independently recorded by the XSLM in its own log.

For example, from each Get-License that's issued, the information might consist of the associated process information, product-id, the date and time of the function invocation, and the LOS-id, all of which are recorded in the CLL. Correspondingly, the XSLM makes its own entry of licensing specific information in its own log.

At a later time, the Correlator is used to match the process specific information in the CLL to licensing sessions in the XSLM log.

Note that a given product might be licensed frequently, and repeatedly, by a number of different processes, resulting in numerous dialogs being recorded on the XSLM log. Even if a timestamp is included as part of the data on the XSLM log (and it may not be), the time will be the time the Get-License was processed in the XSLM server, which may only approximately match the time of the Get-License within the client. Therefore, even for Get-License activity in both the client and the server for the same product, the time-stamp may not provide a clear-cut means for the Correlator to match a particular Get-License instance (and its associated process-related data) that was recorded in the client with the corresponding data written from the server.

Instead, the Correlator matches the data from the two sources by finding nearly identical sequences of activity. For example, the CLL-data might show that Get-License function-calls were issued in the client for the following products, in the following order:

M-B-G-T-R-R-S-A-Z-P-W-B-G-I-T-R-R-O- . . . and in the server in the following order:

H-U-P-T-R-R-M-B-G-E-V-Y-E-M-B-M-B-G-T-R-R-S-A-Z-P-W-B-G-I-T-R-R-O-R-T-G-M . . .

Various well-known methods of correlation may be used, including: shear brute-force pattern matching, sequence alignment matching, ternary search trees, applying Genome matching principles, etc. However, the procedure will benefit if it first eliminates from the server list any product entry that is not in the client list since the server is managing licensing for multiple LOSs. This is first performed on the basis of the LOS-id and, possibly using another such parameter specific to that LOS. For the previous example, the server data entries for E, H, P, U, V, and Y do not appear in the client list, hence they are deleted from the server list:

T-R-R-M-B-G-M-B-M-B-G-T-R-R-S-A-Z-W-B-G-I-T-R-R-O-R-T-G-M . . .

The next step is to locate the sequence containing most, if not all, of the same elements in the CLL:

-M-B-G-M-B-M-B-G-T-R-R-S-A-Z-W-B-G-I-T-R-R-O-

In this example, there are duplicate entries that must be resolved. The matching method may apply other identifying factors to further resolve the list. For example, an arbitrarily high degree of confidence may be obtained based on how many elements must match before a sequence-match is assumed. If time-stamps are also available in the data, they may be used to roughly zero-in on the section of the data at which the match testing should begin and to resolve apparent duplicates.

Once a sequence from the client has been matched with a sequence from the server, the corresponding process data is correlated with the session data, as required.

NOTE: The XLSM specification provides for timestamps from the server and agent for each event to be included within the log records. The agent timestamp is provided by the agent as part of the "hidden" request data that always is passed between agent and server. Thus, the invention includes matching similar to the above using the actual timestamps. However, it may be decided in a particular implementation that the client timestamps are optional. Therefore one cannot always rely on its presence.

In yet another embodiment (G), the user-id is used to correlate license dialogs with job processing information.

When a software product is executed by another process, it initiates a licensing session with the server by requesting a license (Get-License). In addition to the identity of the software product, one of the items of parametric information supplied to the Get-License function call is the identity of the user executing the process (or, for non-online, batch, processes, the user-id on whose behalf the process is being executed).

In many cases, a single user-id may be associated with more than one concurrent session. Typically, this occurs if a user is engaged in multiple concurrent online sessions, or if multiple batch jobs or processes associated with the user happen to execute concurrently. The latter circumstance is particularly likely in the OS/390 mainframe environment, where it is common for hundreds of jobs to be executing at any given time. However, there are many occasions when a single user might be engaged in only a single licensing session at a given time. For example, this might be the case on certain computer systems, such as those systems that only execute a single process at a time. Or it might be the case even on multi-processing systems that certain users are never responsible for more than one concurrent licensing session (though other users on that system might be responsible for more than one).

In such situations, the Correlator uses the user-ids to correlate processes with licensing dialogs as follows:

1. Determine the set (one or more) of known LOSs and user-ids to consider. This may be user-specified, a pre-determined set, or simply all found.
2. Determine the source of process related data to consider. This may consist of the SMF log and, if applicable, other logs containing similar information.
3. From the timestamp contained in the XSLM dialog data, select those dialogs that
   a) begin and end within the duration of a particular process, as determined from the timestamp information contained in the process-related data,
   b) pertain to the same user-id, and
   c) for which no other process exists for the same user-id that is in whole or in part concurrent with the aforesaid process.
4. For each matching record found, process the information as follows: Print report, write to a log file, pass to another process, etc.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A computer-based system that correlates process-related data with license use data reflecting use of software products, the system comprising:

a process-related software facility that collects and stores computer-based and process-related data that is constituted of one or more data fields selected from a data field group consisting of: job-name; job-id; LOS-id; "accounting" information applicable to a job; job-step-id; user-id; processing-program names; and lists of libraries, files or databases used by a process;

a license manager that manages the grant of license use rights to a plurality of software products and which collects and stores data reflecting the use of the software products in the form of software product use data; and a correlator that correlates the software product use data with the process-related data and creates records that reflect the use of the software products related at least in part to the process-related data, and in which the system is configured so that the software products are represented as a plurality of software clients and the license manager is configured as a license manager server, including a facility that creates a token upon a request by a software client to obtain a license certificate to permit execution thereof, in which the token is created by a client exit routine (CER).

2. The system of claim 1, in which the CER is configured to received control in a corresponding client's or agent's address space.

3. The system of claim 1, in which the CER includes a facility that gathers the process-related data.

4. The system of claim 3, in which the CER stores information in a corresponding client logical log (CLL) thereof.

5. A computer-based system that correlates process-related data with license use data reflecting use of software products, the system comprising:

a process-related software facility that collects and stores computer-based and process-related data that is constituted of one or more data fields selected from a data field group consisting of: job-name; job-id; LOS-id; "accounting" information applicable to a job; job-step-id; user-id; processing-Program names; and lists of libraries, files or databases used by a process;

a license manager that manages the grant of license use rights to a plurality of software products and which collects and stores data reflecting the use of the software products in the form of software product use data; and a correlator that correlates the software product use data with the process-related data and creates records that reflect the use of the software products related at least in part to the process-related data, and in which the system is configured so that the software products are represented as a plurality of software clients and the license manager is configured as a license manager server, including a facility that creates a token upon a request by a software client to obtain a license certificate to permit execution thereof, in which the tokens are created by reference to a logical operating system (LOS).

6. The system of claim 5, in which the correlator uses the user-id field of the process-related data to correlate license dialogues with job processing information.

7. The system of claim 6, in which the correlator bases its correlation function on one or more parameters selected from the group including: logical operating system pertaining to different data; source of process-related data; timestamps attached to data records and user-id.

8. A computer-based system that correlates process-related data with license use data reflecting use of software products, the system comprising:

a process-related software facility that collects and stores computer-based and process-related data that is constituted of one or more data fields selected from a data field group consisting of: job-name; job-id; LOS-id; "accounting" information applicable to a job; job-step-id; user-id; processing-program names; and lists of libraries, files or databases used by a process;

a license manager that manages the grant of license use rights to a plurality of software products and which collects and stores data reflecting the use of the software products in the form of software product use data; and a correlator that correlates the software product use data with the process-related data and creates records that reflect the use of the software products related at least in part to the process-related data, and in which the system is configured so that the software products are represented as a plurality of software clients and the license manager is configured as a license manager server, including a facility that creates a token upon a request by a software client to obtain a license certificate to permit execution thereof, further including a facility that creates a license dialogue id (LDI that identifies a current licensing session at the license manager, in which the LDIs are created by a server exit routine (SER) which creates SER data and wherein process-related information and corresponding tokens are stored in a client logical log (CLL).

9. The system of claim 8, further including a facility that correlates the use of tokens with the LDIs and creates matching records reflecting the same.

10. The system of claim 8, in which the license manager comprises a main server and a plurality of server agents, and the agents receive license function calls from the software clients.

11. A computer-based system that correlates process-related data with license use data reflecting use of software products, the system comprising:

a process-related software facility that collects and stores computer-based and process-related data that is constituted of one or more data fields selected from a data field group consisting of: job-name; job-id; LOS-id; "accounting" information applicable to a job; job-step-id; user-id; processing-program names; and lists of libraries, files or databases used by a process;

a license manager that manages the grant of license use rights to a plurality of software products and which collects and stores data reflecting the use of the software products in the form of software product use data; and a correlator that correlates the software product use data with the process-related data and creates records that reflect the use of the software products related at least in part to the process-related data, and in which the system is configured so that the software products are represented as a plurality of software clients and the license manager is configured as a license manager server, including a facility that creates a token upon a request by a software client to obtain a license certificate to permit execution thereof, including a client exit routine (CER) which creates CER data, including the tokens, and including a server exit routine (SER) which creates SER data, including a license dialogue id (LDI).

12. The system of claim 11, in which the correlator is a process that retrieves and correlates the CER data from the software clients with the SER data collected by the license manager and which locates for each token entry, a corresponding entry in the SER data, to create matching records.

13. The system of claim 12, in which the correlator is operable to segregate the matching records based on logical operating systems.

14. The system of claim 11, in which the correlator is operable to carry out sequence matching by correlating sequential data obtained by the CER and sequential information recorded by the SER.

* * * * *